US009699395B1

(12) United States Patent
Boemler

(10) Patent No.: US 9,699,395 B1
(45) Date of Patent: Jul. 4, 2017

(54) IMAGING CIRCUITS AND METHOD

(71) Applicant: RAYTHEON COMPANY, Waltham, MA (US)

(72) Inventor: Christian M. Boemler, Goleta, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 15/072,836

(22) Filed: Mar. 17, 2016

(51) Int. Cl.
H04N 5/217 (2011.01)
H04N 5/228 (2006.01)
H04N 5/357 (2011.01)
H04N 5/363 (2011.01)
H04N 5/378 (2011.01)

(52) U.S. Cl.
CPC ........... H04N 5/3575 (2013.01); H04N 5/363 (2013.01); H04N 5/378 (2013.01)

(58) Field of Classification Search
CPC ..... H03H 11/1217; H04B 1/525; H03F 1/303; H03F 2200/135; H03F 2200/234; H03F 2200/468; H03F 2203/45138; H03F 2203/45526; H03F 3/087; H03G 1/0088; G01J 1/44; G01J 2001/4406; G01J 2001/446
See application file for complete search history.

(56) References Cited

U.S. PATENT DOCUMENTS

| 5,606,277 A * | 2/1997 | Feliz ................. H03F 3/087 250/214 A |
| 6,121,843 A * | 9/2000 | Vampola ............. G11C 27/026 250/214 A |
| 7,595,828 B2 * | 9/2009 | Funatsu ................. H04N 5/347 250/208.1 |
| 9,590,579 B2 * | 3/2017 | Carter .................. H03G 1/0088 |
| 2013/0225101 A1 * | 8/2013 | Basaran .................. H03H 7/12 455/79 |
| 2014/0016027 A1 | 1/2014 | Yang et al. |
| 2016/0178442 A1 * | 6/2016 | Murray ..................... G01J 5/24 702/134 |
| 2016/0198101 A1 | 7/2016 | Bagwell et al. |

FOREIGN PATENT DOCUMENTS

EP 2144433 A2 1/2010

OTHER PUBLICATIONS

International Search Report and Written Opinion for application No. PCT/US2017/013412 dated Mar. 31, 2017.

* cited by examiner

*Primary Examiner* — Trung Diep
(74) *Attorney, Agent, or Firm* — Lando & Anastasi, LLP

(57) ABSTRACT

Imaging circuits and an imaging method are provided. One example of an imaging circuit includes a transimpedance amplifier circuit including an amplifier and a feedback capacitor coupled in a feedback path between an output of the amplifier and an inverting input of the amplifier, a correlated double sampling capacitor, a first switch selectively coupled between a first terminal of the correlated double sampling capacitor and the output of the amplifier along a first path, a second switch selectively coupled between a second terminal of the correlated double sampling capacitor and the output of the amplifier along a second path, the second switch positioned to couple the correlated double sampling capacitor into the feedback path in series with the feedback capacitor when activated, and a sample-hold capacitor coupled via a sample-hold switch to the output of the amplifier.

20 Claims, 6 Drawing Sheets

IMAGING CIRCUITS AND METHOD

BACKGROUND

Capacitive Transimpedance Amplifiers (CTIAs) are frequently used in various arrangements to amplify the output of a photodiode, or other detector, to a usable voltage within a read-out integrated circuit unit cell of a focal plane array. A typical focal plane array includes a two-dimensional array of detector elements, or pixels (i.e., unit cells), organized by rows or columns. CTIAs provide a low impedance to the photodiode and isolate the photodiode from the output voltage of an operational amplifier in the CTIA. A feedback capacitor within a feedback loop of the CTIA is generally used to improve the stability of the CTIA. Conventional imaging circuits generally also include a Correlated Double Sampling (CDS) capacitor and employ CDS schemes to improve noise performance. CDS is a method of noise reduction in imaging circuits in which a reference voltage of a pixel is removed from a signal voltage of the pixel at the end of each integration period.

Existing schemes for imaging circuitry often utilize a CTIA architecture and CDS techniques in combination with sample-hold circuitry. For instance, many conventional read-out integrated circuit unit cells include CTIA and CDS architecture for processing a charge generated by a photodiode corresponding to the flux of light of various wavelengths at that photodiode. Often the charge is accumulated at a capacitor within the circuit, which effectively integrates the charge to produce an output voltage. The output voltage corresponds to the intensity of the flux over a given time interval, generally referred to as the integration interval. Such circuits generally convey the output voltage to downstream components and reset the voltage of the capacitor to a reset value. For instance, the output voltage may be sampled and held at a sample-hold capacitor and periodically bled and digitized by circuitry associated with the unit cell to generate one or more binary values.

SUMMARY OF THE INVENTION

Aspects and embodiments discussed herein are directed to circuits and methods for imaging. In particular, aspects and embodiments are directed to imaging circuits and methods that improve existing capacitive transimpedance amplifier and correlated double sampling Read-Out Integrated Circuit (ROIC) unit cell circuits. In various aspects, an attenuation due to capacitive sharing between a CDS capacitor and a sample-hold capacitor of conventional imaging circuits is avoided by selectively coupling the CDS capacitor into a feedback loop of a CTIA circuit of a unit cell circuit, thereby driving the sample-hold capacitor directly with the CTIA circuit, and without signal attenuation. Accordingly, technical advantages provided by aspects and embodiments may at least include improved feasibility and noise performance, relative to conventional architectures.

According to an aspect, provided is an imaging circuit. In one example, the imaging circuit includes a transimpedance amplifier circuit including an amplifier and a feedback capacitor coupled in a feedback path between an output of the amplifier and an inverting input of the amplifier, a correlated double sampling capacitor, a first switch selectively coupled between a first terminal of the correlated double sampling capacitor and the output of the amplifier along a first path, a second switch selectively coupled between a second terminal of the correlated double sampling capacitor and the output of the amplifier along a second path, the second switch positioned to couple the correlated double sampling capacitor into the feedback path in series with the feedback capacitor when activated, and a sample-hold capacitor coupled via a sample-hold switch to the output of the amplifier.

According to an embodiment, the sample-hold switch directly couples the output of the amplifier and the sample-hold capacitor when activated. In one embodiment, the first terminal of the correlated double sampling capacitor is a negative terminal and the second terminal of the correlated double sampling capacitor is a positive terminal. According to an embodiment, the imaging circuit further includes a photodiode coupled to the inverting input of the amplifier.

In one embodiment, the imaging circuit further includes a voltage clamp coupled to the second terminal of the correlated double sampling capacitor via a clamp switch. According to a further embodiment, the imaging circuit further includes a controller in electrical communication with the clamp switch, and during a noise sampling mode of operation the controller is configured to control the clamp switch to sample kTC noise of the feedback capacitor onto the correlated double sampling capacitor. In an embodiment, during an integration mode of operation the transimpedance amplifier circuit is configured to integrate a charge stored at the feedback capacitor and generate an output voltage at the output of the amplifier.

According to an embodiment, the controller is in further electrical communication with the first switch and the second switch, and during a correlated double sampling mode of operation the controller is configured to deactivate the first switch and activate the second switch to remove the kTC noise of the feedback capacitor from the output voltage. In one embodiment, the controller is in further electrical communication with the sample-hold switch, and during a sample-hold mode of operation the controller is configured to activate the sample-hold switch to directly sample the output voltage onto the sample-hold capacitor.

According to an aspect, provided is an imaging method. In one example, the imaging method includes sampling kTC noise of a feedback capacitor coupled in a feedback path of a transimpedance amplifier circuit onto a correlated double sampling capacitor, generating an output voltage at an output of an amplifier of the transimpedance amplifier circuit based at least in part on a charge stored at the feedback capacitor, switching the correlated double sampling capacitor in series with the feedback capacitor to remove the kTC noise of the feedback capacitor from the output voltage, and sampling the output voltage to a sample-hold capacitor directly coupled with the output of the amplifier by a sample-hold switch.

In an embodiment, the method further includes receiving a current from a photodiode coupled to the transimpedance amplifier circuit. In one embodiment, sampling the kTC noise of the feedback capacitor onto the correlated double sampling capacitor includes controlling a clamp switch between a voltage clamp and a positive terminal of the correlated double sampling capacitor. According to an embodiment, generating the output voltage at the output of the amplifier includes integrating the charge stored at the feedback capacitor. In an embodiment, switching the correlated double sampling capacitor in series with the feedback capacitor includes deactivating a first switch coupled between a negative terminal of the correlated double sampling capacitor and the output of the amplifier, and activating a second switch coupled between the positive terminal of the correlated double sampling capacitor and the output of the amplifier. In an embodiment, the sample-hold capacitor is further coupled to an input of a follower amplifier, and the method further includes holding the output voltage of the amplifier at the sample-hold capacitor, and sensing a sample-hold voltage at the sample-hold capacitor.

According to another aspect, provided is a circuit for imaging. In one example, the circuit includes a transimpedance amplifier circuit including an amplifier and a feedback capacitor coupled in a feedback path between an output of the amplifier and an input of the amplifier, a correlated double sampling capacitor having a first terminal and a second terminal, switching means for sampling kTC noise of the feedback capacitor onto the first terminal of the correlated double sampling capacitor, and coupling the correlated double sampling capacitor into the feedback path in series with the feedback capacitor, and a sample-hold capacitor coupled via a sample-hold switch to the output of the amplifier.

According to an embodiment, the sample-hold switch directly couples the output of the amplifier and the sample-hold capacitor when activated. In an embodiment, the transimpedance amplifier circuit is configured to integrate a charge stored at the feedback capacitor and generate an output voltage, and the switching means is positioned to remove the kTC noise from the output voltage. According to one embodiment, the first terminal of the correlated double sampling capacitor is a negative terminal and the second terminal of the correlated double sampling capacitor is a positive terminal. In an embodiment, the circuit further includes a photodiode coupled to the inverting input of the amplifier.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to imaging circuits and methods, and in particular to Read-Out Integrated Circuit (ROIC) unit cell circuits. Various aspects and embodiments include ROIC unit cells and methods that improve existing capacitive transimpedance amplifier (CTIA), correlated double sampling (CDS), and sample-hold, unit cell circuits.

Figure 1:
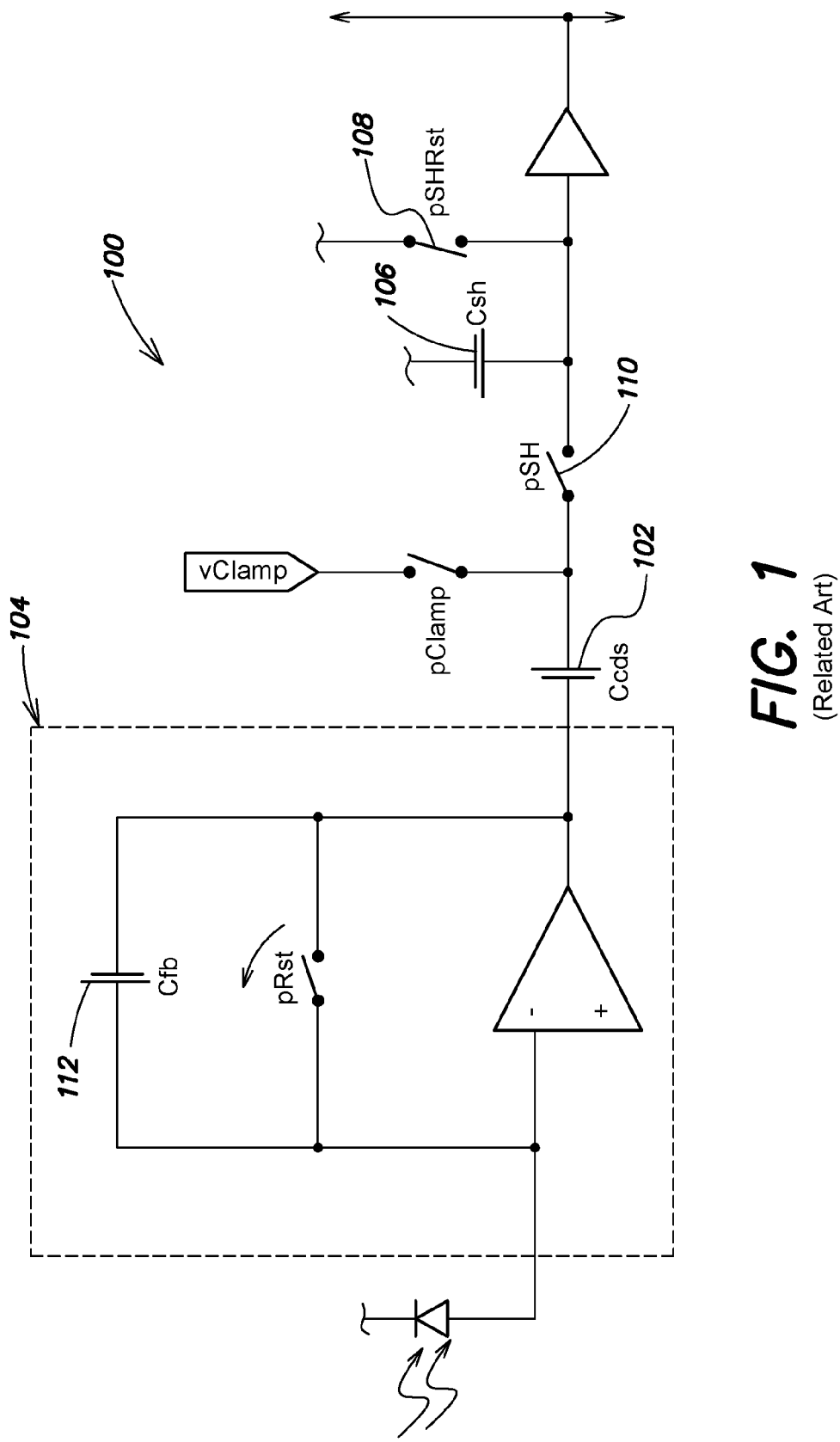
FIG. 1 is a schematic illustration of one example of a known imaging circuit.

FIG. 1 is a schematic diagram of an existing CTIA, CDS, and sample-hold circuit design 100. The circuit 100 includes a floating CDS capacitor 102 coupled between an output of the CTIA 104 and a sample-hold capacitor 106. Accordingly, the floating CDS capacitor 102 is clamped by the kTC noise (Johnson-Nyquist noise) level of the CTIA 104 output after each reset of the unit cell circuit 100. During a sample/hold transfer interval, the output of the CTIA 104 is sampled through the CDS capacitor 102 and into the sample-hold capacitor 106. As a result of charge sharing attenuation between the CDS capacitor 102 and sample-hold capacitor 106, the required value of the sample-hold capacitor 106 is driven much smaller than that of the CDS capacitor 102. The attenuation may also result in the undesirable amplification of noise from components within the circuit 100, such as the sample-hold capacitor 106 and other downstream components.

Accordingly, known arrangements require a fine balance between CDS capacitor 102 values and sample-hold capacitor 106 values to maintain an effective noise performance. While it is desirable to select a sample-hold capacitor 106 having a value much smaller relative to the CDS capacitor 102 to limit charge sharing attenuation, selection of a sample-hold capacitor 106 that is too small in value will cause the kTC noise of the circuit 100 to increase. Further, the noise of the circuit 100 is twice effected by the kTC noise of a sample-hold reset switch 108; first when the kTC noise is charged "backwards" into the CDS capacitor 102, and second when the sample-hold capacitor 106 is sampled (i.e., when a sample-hold switch 110 is activated to snapshot the output voltage). Since known arrangements, such as the circuit 100 shown in FIG. 1, often require a CDS capacitor of a much larger value than its kTC limit, long clamp periods are required. Long clamp periods create integration efficiencies of the CTIA 104, and complicate a fast framerate operation.

For example, conventional circuits may include a 411 femto-farad CDS capacitor 102 and a 110 femto-farad sample-hold capacitor 106, which would result in an attenuation of approximately 0.78 in the CDS capacitor 102 sample-hold capacitor 106 charge sharing. When using a 32 femto-farad feedback capacitor 112 within the CTIA 104 of the conventional circuit 100, the resulting kTC noise of the sample-hold capacitor 106 would be approximately 31.2e-, while the kTC noise of the CDS capacitor 102 would be approximately 18e-. Such an example illustrates that in conventional circuits, the sample-hold capacitor kTC noise undesirably dominates the noise floor, as the CDS capacitor cannot be made large enough relative to the sample-hold capacitor value.

Accordingly, various aspects and embodiments described herein improve noise performance by reducing the input referred noise of various known imaging circuits, and reducing the effects of kTC noise from circuit components. In particular, various aspects and embodiments prevent attenuation due to capacitive sharing between a CDS capacitor and a sample-hold capacitor by selectively coupling the correlated double sampling capacitor into a feedback loop of a CTIA circuit, thereby driving the sample-hold capacitor directly with the CTIA circuit.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 2:
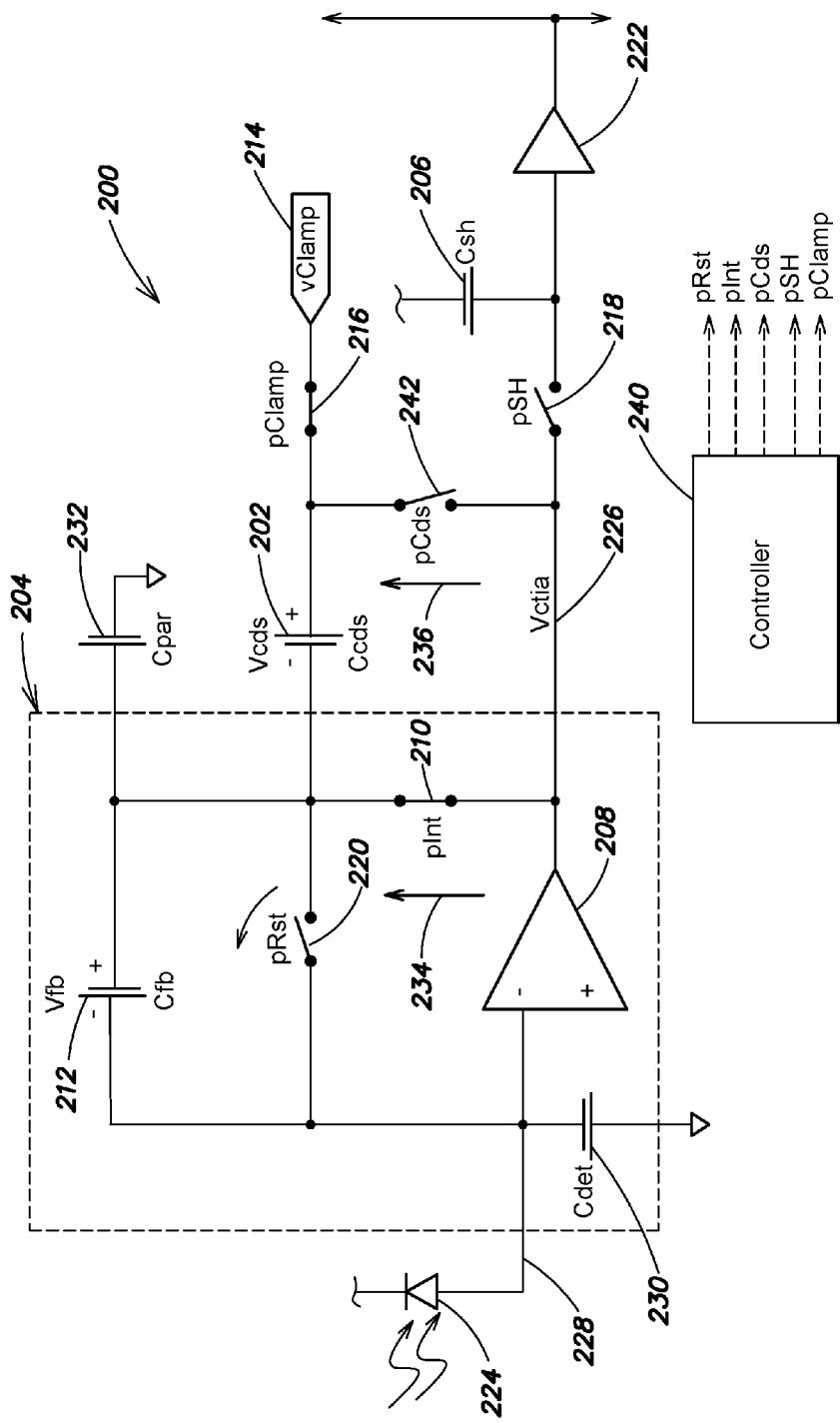
FIG. 2 is a schematic illustration of one example of an imaging circuit in a first mode of operation according to aspects of the invention.

FIG. 2 shows a schematic illustration of one example of an imaging circuit according to aspects and embodiments. The circuit 200 may include a transimpedance amplifier circuit 204, a CDS capacitor 202, a sample-hold capacitor 206, and one or more switching devices (i.e., switches). In particular, the transimpedance amplifier circuit 204 of various embodiments may include an operational amplifier 208 having and inverting input and a non-inverting input, a feedback capacitor 212 coupled in a feedback path of the transimpedance amplifier 204 between the output 226 of the amplifier 208 and an inverting input 228 of the amplifier 208, and a reset switch 220 coupled between the inverting input 228 and the output 226 of the operational amplifier 208. In such an embodiment, a first switch 210 (e.g., an integration switch) is positioned between a first terminal of the CDS capacitor 202 and the output of the amplifier 226 along a first path indicated by arrow 234. A second switch 242 (e.g., a CDS switch) may be positioned between a second terminal of the CDS capacitor 202 and the output 226 of the amplifier 208 along a second path indicated by arrow 236. Switches of various embodiments may include any suitable switching device configured to be activated and deactivated (i.e., open and closed) by a controller 240, which may include a microcontroller.

As shown in FIG. 2, the first terminal of the CDS capacitor 202 may include a negative terminal and the second terminal of the CDS capacitor 202 may include a positive terminal. In various embodiments, the sample-hold capacitor 206 is coupled via a sample-hold switch 218 to the output 226 of the amplifier 208. As shown, the sample-hold switch 218 directly couples the output 226 of the amplifier 208 and the sample-hold capacitor 206 when activated (i.e., closed). In various embodiments, the capacitive elements of the circuit 200 may be reduced to relatively small values. In particular embodiments, the circuit 200 may include a sample-hold capacitor 206 and a CDS capacitor 202 having substantially the same value. For instance, the CDS capacitor 202 of one embodiment may have a capacitance value of 260 femto-farads and the sample-hold capacitor 206 may have a capacitance value of 260 femto-farads. In such an embodiment, the feedback capacitor 212 may have a capacitance value of 32 femto-farads. However, various other suitable values may be used in further embodiments.

As discussed in further detail below, the circuit 200 may additionally include a photodiode 224, a voltage clamp 214, and a follower amplifier 222. $C_{det}$ 230 is shown to represent the parasitic capacitance of the corresponding detector, and $C_{par}$ 232 is shown to represent the parasitic capacitance as a result of routing within the circuit 200 (e.g., metal wiring or a metal-oxide-metal capacitor bottom plate). According to one embodiment, the voltage clamp 214 is selectively coupled to the second terminal of the CDS capacitor 202 via the clamp switch 216. As shown in FIG. 2, the photodiode 224 may be coupled to the inverting input 228 of the amplifier 208 of the transimpedance amplifier circuit 204. The particular photodiode 224 of various embodiments may include any detector selected to be sensitive to a particular wavelength of light. For instance, the photodiode 224 may include a detector configured to generate a current responsive to receiving wavelengths of light ranging from as small as 0.3 microns up to 2.5 microns and greater. For example, light of a desired wavelength may be generated by one or more optical source of an associated illumination system.

In various embodiments, the follower amplifier 222 may include an operational amplifier having an input coupled to the sample-hold capacitor 206, as FIG. 2 shows. As discussed herein, the sample-hold capacitor 206 of various embodiments is configured to store and provide an integrated signal from the CTIA circuit 204, for instance, to downstream components such as the follower amplifier 222. In one example, the follower amplifier 222 includes a (near) unity gain amplifier, such as a source follower. An output of the follower amplifier 222 may be tied to a column bus, along with an output of other unit cell circuits. In various embodiments, the follower amplifier 222 is configured to sense a sample-hold voltage at the sample-hold capacitor 206 and drive such a voltage to the column bus.

FIG. 2 shows a schematic illustration of the circuit 200 during a first mode of operation, which in various embodiments may be a noise sampling mode of operation, such as a kTC noise sampling mode of operation. As previously discussed, the kTC noise of components within the circuit 200 may have undesirable effects on the circuit 200 and downstream processes, such as imaging operations. In certain embodiments, the CTIA circuit 204 may include a common source amplifier where the output voltage of the CTIA circuit 204 is a threshold voltage of a CTIA circuit 204 input transistor during activation of the reset switch 220. That is, the output voltage of the operational amplifier 208 may be a common mode voltage ($V_{cm}$) of the amplifier 208. After the release of the reset switch 220, the feedback capacitor 212 causes kTC noise in the output voltage, as discussed herein. For purposes of explanation, during the sampling mode of operation, and after deactivation of the reset switch 220 the output voltage of the operational amplifier 208 may be represented as:

$$V_{tcia} = V_{cm} + V_{kTC},$$

where $V_{cm}$ is the virtual amplifier reference (e.g., equal to the $V_{gs}$ of the common source amplifier input transistor), and $V_{kTC}$ is the kTC noise caused by the feedback capacitor 212 after the deactivation of the reset switch 220.

Accordingly, in various embodiments during a kTC sampling period and after the immediate deactivation of the reset switch 220, the voltage clamp 214 is activated to sample the kTC noise onto the CDS capacitor 202. In various embodiments, the voltage clamp 214 fixes the upper and lower extreme of an input waveform to a fixed DC voltage level, which in this case may include the reset level of the CTIA circuit 204. That is, during the first mode of operation, the clamp switch 214 is activated to sample the reset voltage and the kTC noise caused by the feedback capacitor 212 on to the CDS capacitor 202.

In various embodiments, the integrated photocurrent across the feedback capacitor 212, $V_{int}$, may be represented as:

$$V_{int} = \int (I_{photo}/(C_{fb} * T_{int})),$$

where $I_{photo}$ is the current from the photodiode 224, $C_{fb}$ is the value of the feedback capacitor 212 (i.e., capacitance value), and $T_{int}$ is the integration period. In certain embodiments, the integration period of the circuit 100 may range from 1 ms to 30 ms, and may be substantially the same as the frame rate of operation of the circuit 200. As discussed above with reference to FIG. 1, various conventional architectures require large CDS capacitor values (relative to sample-hold capacitor values) to minimize attenuation within the circuit. Such arrangements require a corresponding long duration of time to settle the reset level (i.e., the reset voltage and kTC noise) after deactivation of the reset switch. As the duration can by significant, many conventional approaches suffer from poor integration efficiency. In contrast, various aspects and embodiments improve integration efficiency as the value of the CDS capacitor 202 is not directly proscribed by the value of the sample-hold capacitor 206. In FIG. 2, the voltage at the feedback capacitor 212 can be represented as:

$$V_{fb} = (V_{cm} + V_{kTC}) - V_{cm},$$

and the voltage at the CDS capacitor 202 can be represented as:

$$V_{cds} = vClamp - (V_{cm} + V_{kTC}),$$

where vClamp is the voltage of the voltage clamp 214.

Figure 3:
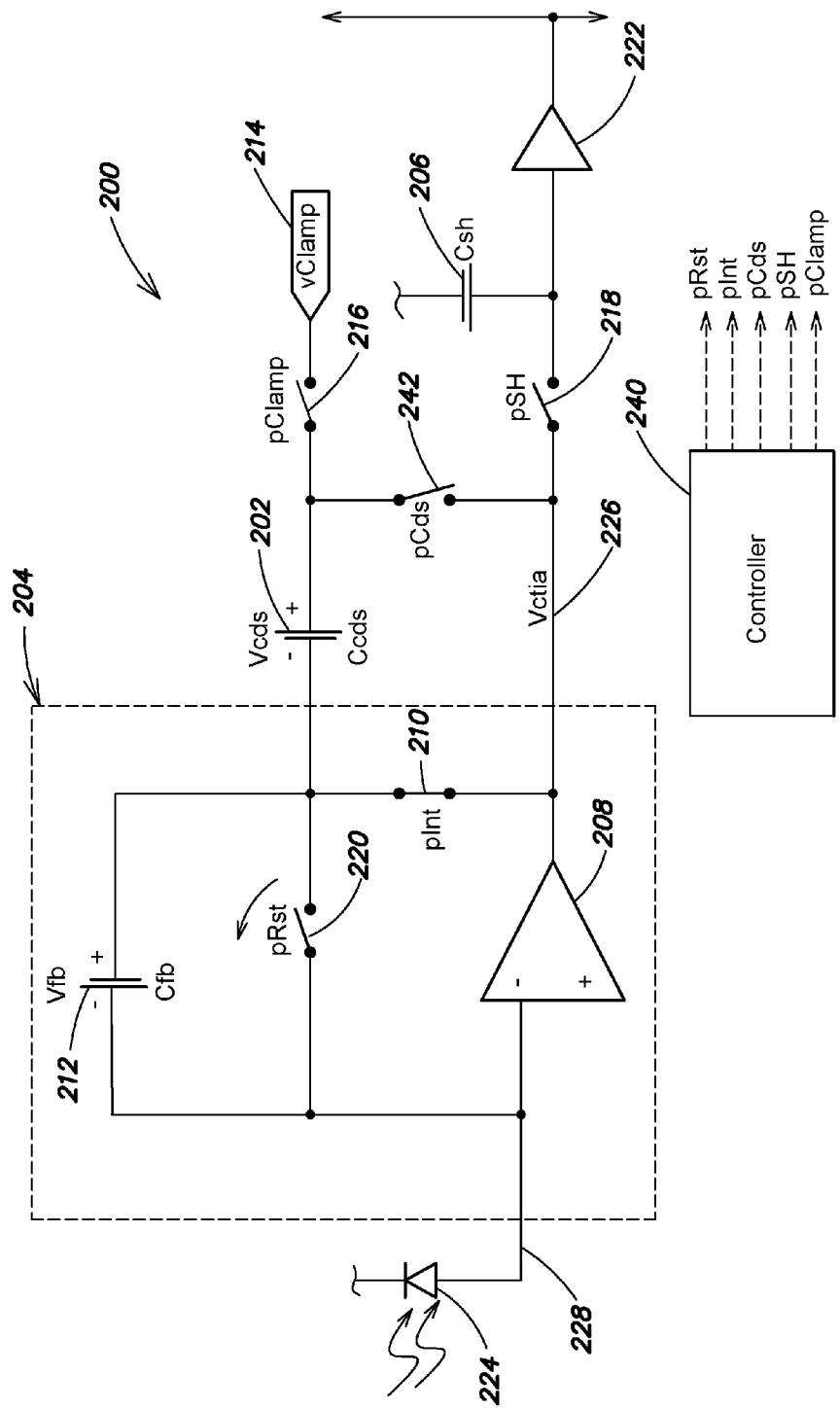
FIG. 3 is a schematic illustration of the imaging circuit of FIG. 2 shown in a second mode of operation, according to aspects of the invention.

As shown in FIG. 2, during the noise sampling mode, the sample-hold switch 218 remains deactivated and the second switch 242 remains deactivated. In various embodiments the circuit 200 is configured to transition from the first mode (i.e., the noise sampling mode) to the second mode (i.e., an integration mode) once the CTIA circuit 204 has settled the kTC noise and reset voltage onto the CDS capacitor 202. For instance, the controller 240 may deactivate the clamp switch 216 to transition from the first mode of operation and begin integration based on a predetermined fixed delay period. FIG. 3 shows a schematic illustration of the imaging circuit 200 of FIG. 2 in an integration mode of operation (i.e., the second mode of operation), according to various aspects and embodiments. During the integration mode of operation, the reset switch 220 remains deactivated, the first switch 210 remains activated, the second switch 242 remains deactivated, the sample-hold switch 218 remains deactivated, and the clamp switch 216 is deactivated, for example, by the controller 240. FIG. 3 shows such a configuration. During the integration mode of operation, charge stored at the feedback capacitor 212 is effectively integrated producing an output voltage corresponding to the intensity of the flux received at the photodiode 224 over a given integration interval. The output voltage is generated at the output 226 of the amplifier 208.

In various embodiments, during the integration mode of operation, the kTC noise caused by the feedback capacitor 212 is held floating at the CDS capacitor 202. Just before a third mode of operation during which the circuit 200 is configured to perform a snapshot sample of the output voltage, the first switch 210 is deactivated and the second switch 242 is activated to couple the CDS capacitor 202 into the feedback loop of the CTIA circuit 204 and in series with the feedback capacitor 212, transitioning the circuit 200 into the third mode of operation. In particular embodiments, the first switch 210 and the second switch 242 are controlled based on non-overlapping switching signals such that the first switch 210 and the second switch 242 are controlled at different moments in time. In various embodiments, during the integration mode of operation, the output voltage of the operational amplifier 208 may be represented as:

$$V_{ctia} = V_{cm} + V_{kTC} - V_{int}.$$

In such an embodiment, the voltage at the feedback capacitor 212 may be represented as:

$$V_{fb} = (V_{cm} + V_{kTC} - V_{int}) - V_{cm},$$

and the voltage at the CDS capacitor 202 may be represented as:

$$V_{cds} = vClamp - (V_{cm} + V_{kTC}).$$

When the second switch 242 is activated (i.e., closed) and the first switch 210 is deactivated (i.e., opened), the output voltage of the operational amplifier 208 experiences an instantaneous subtraction of the charge stored at the CDS capacitor 202 (i.e., the previously stored kTC noise of the feedback capacitor 212). Accordingly, the only noise across the feedback capacitor 212 may be negligible kTC parasitics, as coupling the feedback capacitor 212 in series with the negative terminal of the CDS capacitor 202 effectively removes the kTC noise from the output voltage of the amplifier 208. While discussed herein as separate from the second mode of operation (i.e., the integration mode), it is appreciated that in various embodiments the third mode of operation (i.e., a CDS mode) may be performed during the integration mode of operation, and in particular, performed at the end of the integration mode of operation. Accordingly, the CDS mode of operation is discussed herein as separate from the integration mode of operation for convenience of explanation only.

Figure 4:
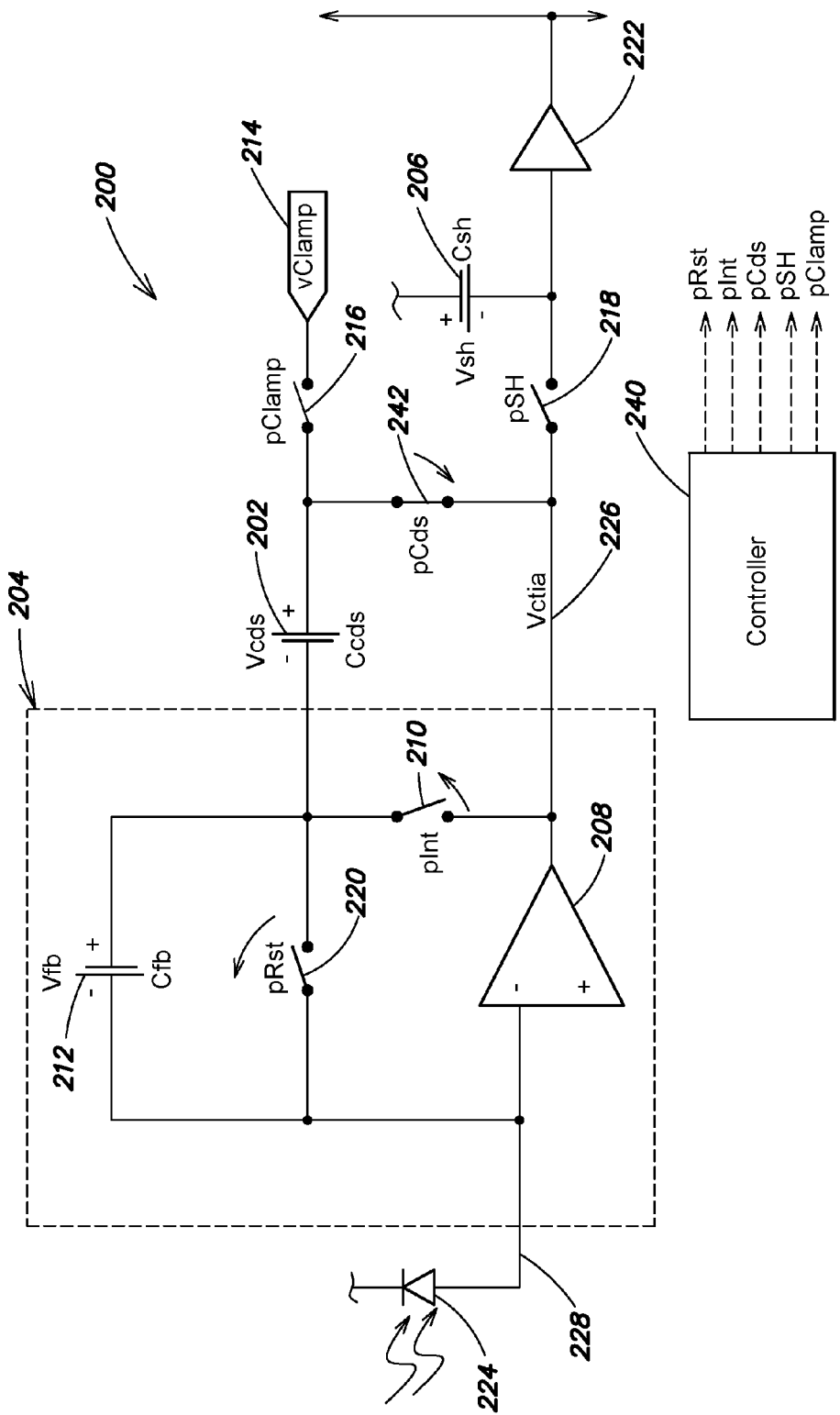
FIG. 4 is a schematic illustration of the imaging circuit of FIG. 2 shown in a third mode of operation, according to aspects of the invention.

FIG. 4 shows a schematic illustration of the read-out integrated circuit 200 of FIG. 2 shown in the third mode of operation, according to various aspects and embodiments. During the third mode of operation, as shown, the reset switch 220 remains deactivated, the first switch 210 is deactivated at a first moment in time, the second switch 242 is activated at a second moment in time, the clamp switch 216 remains deactivated, and the sample-hold switch 218 remains deactivated. During the CDS mode of operation, the voltage at the feedback capacitor 212 may be represented as:

$$V_{fb} = (V_{cm} + V_{kTC} - V_{int}) - V_{cm},$$

and the voltage at the CDS capacitor 202 may be represented as:

$$V_{cds} = vClamp - (V_{cm} V_{kTC}).$$

As discussed above, in various embodiments the charge at the CDS capacitor 202 remains constant during the integration phase, and accordingly, is held at the same value during the CDS mode of operation. However, as a result of coupling the CDS capacitor in series with the feedback capacitor 212 within the feedback path of the CTIA circuit 204, the circuit 200 is configured to effectively subtract the kTC noise from the output voltage of the operational amplifier 208, which may be represented as:

$$V_{ctia} = V_{cm} + V_{fb} + V_{cds},$$

and reduced as follows:

$$V_{ctia} = V_{cm} + [(V_{cm} + V_{kTC} - V_{int}) - V_{cm}] + [v\text{Clamp} - (V_{cm} + V_{kTC})] = v\text{Clamp} - V_{int}.$$

Figure 5:
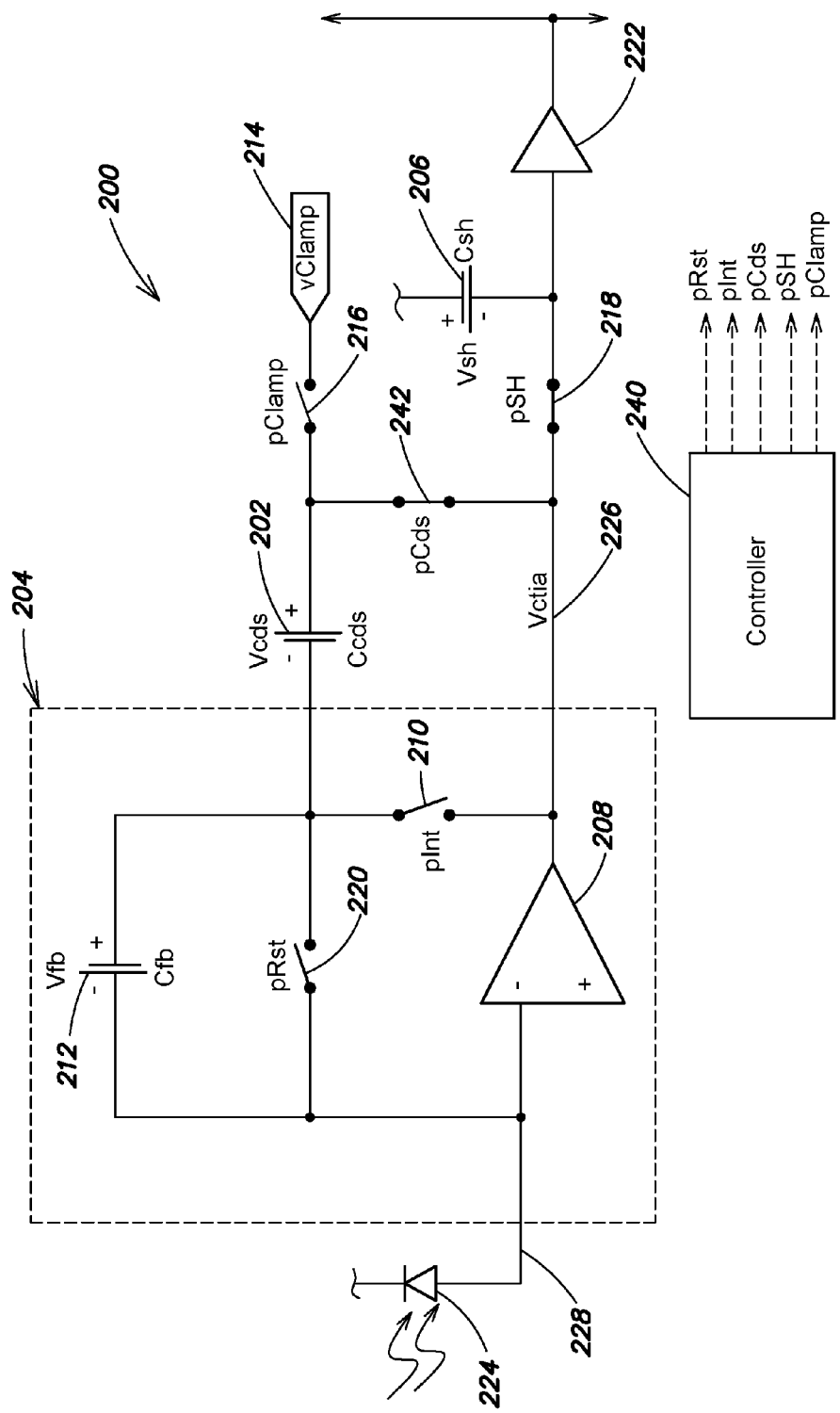
FIG. 5 is a schematic illustration of the imaging circuit of FIG. 2 shown in a fourth mode of operation, according to aspects of the invention.

In various embodiments, following the CDS mode of operation, the circuit 200 is configured to transition to a fourth mode of operation (e.g., a sample-hold mode of operation). FIG. 5 is a schematic illustration of the imaging circuit 200 of FIG. 2 shown in a sample-hold mode of operation, according to aspects and embodiments. During the sample-hold mode of operation, the output voltage of the amplifier 208 is sampled directly onto the sample-hold capacitor 206. In various embodiments, the sample-hold capacitor 206 is driven directly by the CTIA circuit 204 output which avoids and removes additional noise created by the operation of the sample-hold reset switch of conventional schemes (e.g., switch 108 shown in FIG. 1). Furthermore, all gains are unity to the CTIA circuit 204 output, as the capacitance values of the CDS capacitor 202 and the sample-hold capacitor 206 have a minimal effect on the voltage equations provided above.

In one embodiment, the noise after activating the reset switch 220 may be further reduced by setting the value of the CDS capacitor 202 about equal to the value of the sample-hold capacitor 206. Such an implementation would balance any input referred noise from the CDS capacitor 202 and the sample-hold capacitor 206. This further improves on conventional schemes, such as the layout shown in FIG. 1, which would require a CDS capacitor of much larger value than that of the sample-hold capacitor. Further still, setting the value of the CDS capacitor 202 about equal to the value of the sample-hold capacitor 206 permits short clamp pulses, which may further improve efficiency during the integration mode of operation.

Accordingly, during the sample-hold mode of operation, the voltage at the feedback capacitor 212 may be represented as:

$$V_{fb} = (V_{cm} + V_{kTC} - V_{int}) - V_{cm},$$

and the voltage at the CDS capacitor 202 may be represented as:

$$V_{cds} = v\text{Clamp} - (V_{cm} + V_{kTC}),$$

as previously discussed. Further, the voltage at the sample-hold capacitor 206 can be represented as:

$$V_{sh} = V_{ctia} = v\text{Clamp} - V_{int}$$

Accordingly, various embodiments avoid charge sharing attenuation and resolve the undesirable effects of kTC noise within conventional imaging circuits, improving the overall noise performance of the circuit 200.

As discussed above, various embodiments may include a controller (e.g., controller 240) operatively connected to and configured to activate and/or deactivate one or more of the switches of various embodiments, such as the first switch 210, the second switch 242, the clamp switch 216, the sample-hold switch 218, and the reset switch 220. The controller 240 may include a single controller; however, in various other embodiments the controller 240 may consist of a plurality of controllers and/or control subsystems which may include an external device, signal processing circuitry, or other control circuitry. In particular, the controller 240 may include analog processing circuitry (e.g., a microcontroller) and/or digital signal processing circuitry (e.g., a digital signal processor (DSP)). For instance, the microcontroller of various embodiments may include a processor core, memory, and programmable input/output components. The controller 240 may be configured to automatically control various components of the imaging circuit, such as the one or more switching devices.

Figure 6:
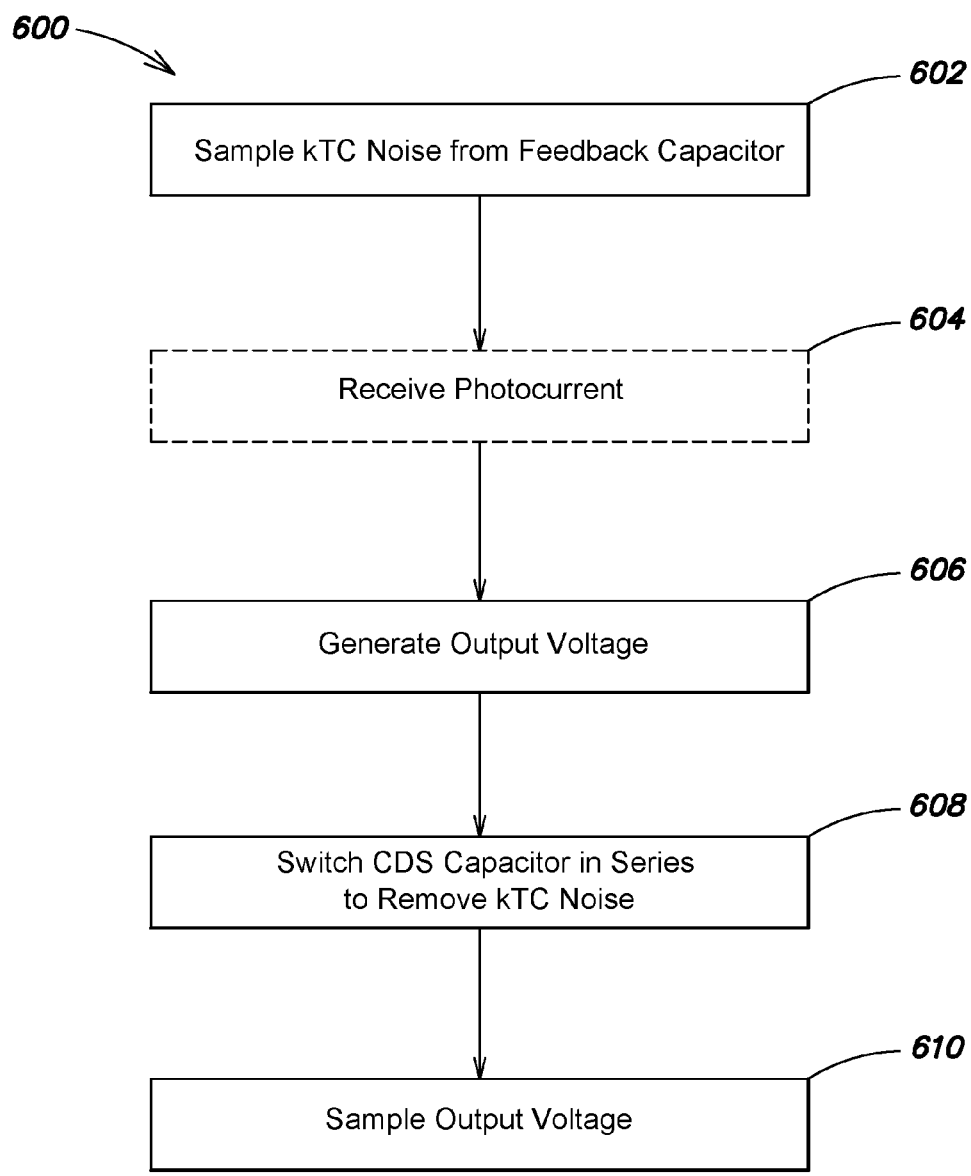
FIG. 6 is an example process flow according to aspects of the invention.

As described above with reference to FIGS. 2-5, several embodiments perform processes that improve known schemes for CTIA and CDS operation. In some embodiments, these processes are executed by an imaging circuit, such as the circuit 200 described above with reference to FIGS. 2-5. One example of such a process is illustrated in FIG. 6. According to this example, the process 600 may include the acts of sampling kTC noise of a feedback capacitor within a CTIA, generating an output voltage, switching a CDS capacitor in series with the feedback capacitor to remove the kTC noise, and sampling the output voltage to a sample-hold capacitor. FIG. 6 is discussed within continuing reference to the circuit 200 shown in FIGS. 2-5.

In act 602, the process 600 includes sampling kTC noise caused by the feedback capacitor within the feedback path of the CTIA onto a correlated double sampling capacitor. As described herein, such a process may be performed by the circuit during a first mode of operation (e.g., a noise sampling mode of operation). Following release of the reset switch, the process 600 may include activating the voltage clamp switch to sample the reset level of the circuit onto the CDS capacitor. As discussed above, this includes the virtual amplifier reference ($V_{cm}$) and the kTC noise caused by the feedback capacitor when the reset switch is deactivated. In various embodiments, during the first mode of operation the process 600 may include controlling the first switch (e.g., the integration switch) coupled between the first terminal of the correlated double sampling capacitor and the output of the amplifier along the first path to remain in an active position (i.e., closed position), and controlling the clamp switch between the voltage clamp and a second terminal of the correlated double sampling capacitor to remain in an active position (i.e., closed positioned).

As discussed herein, in various embodiments the circuit may be configured to transition from the first mode (i.e., the noise sampling mode) to the second mode (i.e., an integration mode). The second mode of operation may include one or more processes for receiving a photocurrent and generating an output voltage at the output of the CTIA (act 604 and act 606). For example, in various embodiments the process 600 may include generating an output voltage at an output of the CTIA based at least in part on a charge stored at the feedback capacitor. During the integration mode of operation, the reset switch remains deactivated, the first switch remains activated, the second switch remains deactivated, the sample-hold switch remains deactivated, and the clamp switch remains deactivated. During the integration mode of operation, the process 600 may include integrating the charge stored at the feedback capacitor to produce a voltage corresponding to the intensity of the flux received at the photodiode over a given integration interval. The output voltage is generated at the output of the CTIA.

In various embodiments, during the integration mode of operation, the process 600 may include holding the kTC noise caused by the feedback capacitor at the CDS capacitor. Just before a fourth mode of operation (i.e., the sample-hold mode of operation), during which the process 600 may include performing a snapshot sample, the process 600 may include deactivating the first switch and activating the second switch to couple the CDS capacitor into the feedback loop of the CTIA and in series with the feedback capacitor. In various embodiments, deactivating the first switch includes deactivating the first switch at a first time, and activating the second switch includes activating the second switch at a second time, such that the first switch and second switch are activated based on non-overlapping switching signals. In particular, this may include removing the kTC noise from the output voltage at the output of the amplifier based on the charge stored at the CDS capacitor (act 608). Accordingly, the only noise across the feedback capacitor at this point is negligible kTC parasitics as coupling the feedback capacitor in series with the negative terminal of the CDS capacitor effectively removes the kTC noise from the output voltage. While discussed herein as a third mode of operation separate from the second mode of operation (i.e., an integration mode), it is appreciated that in various embodiments the third mode of operation may be performed during the integration mode of operation, and in particular, performed at the end of the integration mode of operation. Accordingly, the CDS mode of operation is discussed herein as separate from the integration mode of operation for purposes of explanation only.

In various embodiments, the third mode of operation transitions to the fourth mode of operation (i.e., the sample-hold mode). In various embodiments, the fourth mode of operation may include the act of sampling the output voltage to a sample-hold capacitor directly coupled with the output of the amplifier by a sample-hold switch (act 610). In various embodiments, the sample-hold capacitor is driven directly by the CTIA output which avoids and removes additional noise created by the operation of the sample-hold reset switch of conventional schemes (e.g., switch 108 shown in FIG. 1). Furthermore, all gains are unity to the CTIA output, as the capacitance values of the CDS capacitor and the sample-hold capacitor have a minimal effect on the voltage equations provided above.

In further embodiments, the process 600 may include holding the output voltage of the amplifier at the sample-hold capacitor, and providing an integrated output signal. In various embodiments, the process 600 may include one or more processes for providing an output signal based at least in part on the charge stored at the sample-hold capacitor. In one example, the process 600 includes sensing a sample-hold voltage at the sample-hold capacitor and driving the sample-hold voltage to a column bus without draining the charge stored at the sample-hold capacitor. For instance, the process 600 may include buffering the sample-hold voltage from the sample-hold capacitor to the column bus with a source follower amplifier coupled to the sample-hold capacitor.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An imaging circuit comprising:
   a transimpedance amplifier circuit including an amplifier and a feedback capacitor coupled in a feedback path between an output of the amplifier and an inverting input of the amplifier;
   a correlated double sampling capacitor;
   a first switch selectively coupled between a first terminal of the correlated double sampling capacitor and the output of the amplifier along a first path;
   a second switch selectively coupled between a second terminal of the correlated double sampling capacitor and the output of the amplifier along a second path, the second switch positioned to couple the correlated double sampling capacitor into the feedback path in series with the feedback capacitor when activated; and
   a sample-hold capacitor coupled via a sample-hold switch to the output of the amplifier.

2. The imaging circuit of claim 1, wherein the sample-hold switch directly couples the output of the amplifier and the sample-hold capacitor when activated.

3. The imaging circuit of claim 2, wherein the first terminal of the correlated double sampling capacitor is a negative terminal and the second terminal of the correlated double sampling capacitor is a positive terminal.

4. The imaging circuit of claim 3, further comprising a photodiode coupled to the inverting input of the amplifier.

5. The imaging circuit of claim 1, further comprising a voltage clamp coupled to the second terminal of the correlated double sampling capacitor via a clamp switch.

6. The imaging circuit of claim 5, further comprising a controller in electrical communication with the clamp switch, wherein during a noise sampling mode of operation the controller is configured to control the clamp switch to sample kTC noise of the feedback capacitor onto the correlated double sampling capacitor.

7. The imaging circuit of claim 6, wherein during an integration mode of operation the transimpedance amplifier circuit is configured to integrate a charge stored at the feedback capacitor and generate an output voltage at the output of the amplifier.

8. The imaging circuit of claim 7, wherein the controller is in further electrical communication with the first switch and the second switch, and wherein during a correlated double sampling mode of operation the controller is configured to deactivate the first switch and activate the second switch to remove the kTC noise of the feedback capacitor from the output voltage.

9. The imaging circuit of claim 8, wherein the controller is in further electrical communication with the sample-hold switch, and wherein during a sample-hold mode of operation the controller is configured to activate the sample-hold switch to directly sample the output voltage onto the sample-hold capacitor.

10. An imaging method comprising:
    sampling kTC noise of a feedback capacitor coupled in a feedback path of a transimpedance amplifier circuit onto a correlated double sampling capacitor;
    generating an output voltage at an output of an amplifier of the transimpedance amplifier circuit based at least in part on a charge stored at the feedback capacitor;
    switching the correlated double sampling capacitor in series with the feedback capacitor to remove the kTC noise of the feedback capacitor from the output voltage; and
    sampling the output voltage to a sample-hold capacitor directly coupled with the output of the amplifier by a sample-hold switch.

11. The method of claim 10, further comprising receiving a current from a photodiode coupled to the transimpedance amplifier circuit.

12. The method of claim 10, wherein sampling the kTC noise of the feedback capacitor onto the correlated double sampling capacitor includes controlling a clamp switch between a voltage clamp and a positive terminal of the correlated double sampling capacitor.

13. The method of claim 12, wherein generating the output voltage at the output of the amplifier includes integrating the charge stored at the feedback capacitor.

14. The method of claim 13, wherein switching the correlated double sampling capacitor in series with the feedback capacitor includes deactivating a first switch coupled between a negative terminal of the correlated double sampling capacitor and the output of the amplifier, and activating a second switch coupled between the positive terminal of the correlated double sampling capacitor and the output of the amplifier.

15. The method of claim 14, wherein the sample-hold capacitor is further coupled to an input of a follower amplifier, and the method further comprises:

holding the output voltage of the amplifier at the sample-hold capacitor; and sensing a sample-hold voltage at the sample-hold capacitor.

16. A circuit for imaging comprising:

a transimpedance amplifier circuit including an amplifier and a feedback capacitor coupled in a feedback path between an output of the amplifier and an input of the amplifier;

a correlated double sampling capacitor having a first terminal and a second terminal;

switching means for sampling kTC noise of the feedback capacitor onto the first terminal of the correlated double sampling capacitor, and coupling the correlated double sampling capacitor into the feedback path in series with the feedback capacitor; and a sample-hold capacitor coupled via a sample-hold switch to the output of the amplifier.

17. The circuit of claim 16, wherein the sample-hold switch directly couples the output of the amplifier and the sample-hold capacitor when activated.

18. The circuit of claim 16, wherein the transimpedance amplifier circuit is configured to integrate a charge stored at the feedback capacitor and generate an output voltage, and wherein the switching means is positioned to remove the kTC noise from the output voltage.

19. The circuit of claim 16, wherein the first terminal of the correlated double sampling capacitor is a negative terminal and the second terminal of the correlated double sampling capacitor is a positive terminal.

20. The circuit of claim 19, further comprising a photodiode coupled to the inverting input of the amplifier.

* * * * *